United States Patent [19]

Buriks et al.

[11] Patent Number: 5,098,605
[45] Date of Patent: Mar. 24, 1992

[54] VINYL PHENOL POLYMERS FOR DEMULSIFICATION OF OIL-IN-WATER EMULSIONS

[75] Inventors: Rudolf S. Buriks; Allen R. Fauke, both of St. Louis, Mo.; David J. Poelker, Belleville, Ill.

[73] Assignee: Petrolite Corporation, St. Louis, Mo.

[21] Appl. No.: 452,864

[22] Filed: Dec. 19, 1989

[51] Int. Cl.$^5$ .............................................. B01D 17/04
[52] U.S. Cl. .................................... 252/343; 252/358; 252/331; 210/708
[58] Field of Search ............... 252/328, 331, 343, 358; 210/708; 208/188; 525/328.9, 329.5, 378

[56] References Cited

U.S. PATENT DOCUMENTS

| | | | |
|---|---|---|---|
| 2,560,333 | 7/1951 | De Groote et al. | 252/358 X |
| 2,771,462 | 11/1956 | Shen | 252/358 X |
| 3,320,208 | 5/1967 | Mange | 252/358 X |
| 3,557,017 | 1/1971 | Mange et al. | 252/358 X |
| 4,230,599 | 10/1980 | Elfers | 252/358 X |
| 4,316,995 | 2/1982 | Pittet et al. | 568/780 |
| 4,678,843 | 7/1987 | Elmore et al. | 525/378 |
| 4,689,371 | 8/1987 | Elmore et al. | 525/329.5 X |
| 4,826,625 | 5/1989 | Thompson et al. | 252/344 |
| 4,931,191 | 6/1990 | Braden et al. | 210/708 X |

OTHER PUBLICATIONS

Danusso et al., Chim. Ind. 47(5) pp. 493–496 (1965) [Chemical Abstracts 63:5765e].

*Primary Examiner*—Richard D. Lovering
*Assistant Examiner*—Daniel S. Metzmaier
*Attorney, Agent, or Firm*—Stanley M. Tarter; Kenneth Soloman

[57] ABSTRACT

Oil-in-water emulsions are resolved by contacting the emulsion with a polymer of vinyl phenol or a salt thereof. The polymers may be made by hydrolyzing polyacetoxystyrene.

10 Claims, No Drawings

VINYL PHENOL POLYMERS FOR DEMULSIFICATION OF OIL-IN-WATER EMULSIONS

BACKGROUND OF THE INVENTION

This invention relates to the resolution or breaking of oil-in-water emulsions. Specifically, the invention relates to chemical means for resolving such emulsions.

Various waters such as "produced water" from oil wells and various industrial water waste streams will be in the form of emulsions which have an internal "oil" phase, generally present as very small droplets. For environmental or other reasons it is frequently desired to resolve or "break" these emulsions to separate the oil phase from the water phase. The most common method of resolving such emulsions is the addition of a chemical demulsification compound.

One approach at a chemical demulsifier is the use of zinc salts such as zinc chloride. However, the use of zinc or other heavy metals is of considerable environmental concern and poses its own disposal problems. Further, the zinc salts are corrosive toward metal pumps, tanks, and drums.

Another approach is the use of certain tridithiocarbamic acid compounds as described in U.S. Pat. No. 4,826,625 (Thompson - Petrolite; 1989). However, this approach has limited applicability, depending on the nature of the oil and the pH of the water.

SUMMARY OF THE INVENTION

Briefly, the invention is a method of resolving an oil-in-water emulsion by contacting the emulsion with a polyvinylphenol polymer, or salts thereof.

The invention is particularly effective, easy to carry out, and applicable to a wide variety of emulsions. Importantly, the invention does not require the use of zinc or other heavy metals, and does not have the environmental problems inherent in such metals.

DETAILED DESCRIPTION OF THE INVENTION

In this specification and claims, numerical values are not critical unless otherwise stated. That is, the numerical values may be read as if they were prefaced with the word "about" or "substantially".

The invention concerns an oil-in-water demulsifier polymer having repeating units of the structure

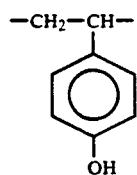

or preferably salts thereof. Desired salts are alkali metal or alkaline earth salts, more desirably alkali metal salts, preferably lithium, sodium, or potassium salts, and most preferably the sodium salt.

The above structure corresponds to the polymer of vinyl phenol. However, due to the lack of stability of vinyl phenol monomer, it is generally not practical to prepare the polymer directly. Instead, the demulsifier polymer is preferably prepared by polymerizing acetoxystyrene

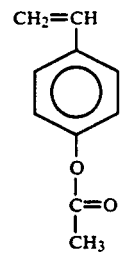

and thereafter hydrolyzing the acetoxystyrene polymer. Acetoxystyrene is well known to those skilled in the art (including teachings in U.S. Pat. No. 4,316,995) and is commercially available from Hoechst-Celanese of Corpus Christi, Tex., USA. The acetoxystyrene is polymerized using conventional addition polymerization techniques well known to those skilled in the art. The polymerization preferably takes place in an aqueous suspension or in solution such as in xylene. The polymerization may take place at temperatures of 50° C. to 200° C., preferably 100° C. to 140° C., for 2 to 12 hours, preferably 4 to 8 hours, preferably with the aid of a free radical catalyst such as t-butylperbenzoate or di-t-butylperoxide.

Although a homopolymer may be formed, the use of a copolymer is somewhat preferred. Suitable comonomers include ethylenically unsaturated aromatic monomers such as styrene, methylstyrene, ethylstyrene, p-isobutylstyrene; and non-aromatic ethylenically unsaturated monomers such as 1,3-butadiene, isoprene, lower (e.g., $C_1$ to $C_{18}$) alkyl esters of acrylic or methacrylic acid, and acrylic or methacrylic acid. Preferred comonomers are styrene and p-methylstyrene. The presence of comonomers can dilute the cost of the acetoxystyrene and can decrease or increase the hydrophobicity of the polymer. The latter fact leads to the caution that excessive hydrophobic comonomer may make the demulsifier polymer too hydrophobic to be water soluble (water solubility is generally desired for the final polymer). Generally, the acetoxystyrene polymer will contain 30 to 100, desirably 50 to 100, preferably 70 to 100 mole percent acetoxystyrene.

Although the molecular weight of the polymer may vary, for example, from an Mw of 1,000 to 800,000, more desirably 5,000 to 90,000, in general, the lower molecular weight polymers form solutions more easily than higher molecular weight polymers.

After the acetoxystyrene polymer is formed it is necessary to hydrolyze the polymer to form the phenol or phenol salt. The hydrolysis may be accomplished in a conventional manner with a base, preferably in a reactive solvent such as methanol. Methanol will react with the byproduct acetic acid to form methyl acetate which is easier to separate from the polymer. Desirable bases are alkali metal or alkaline earth metal hydroxides, more desirably alkali metal hydroxides, preferably lithium, sodium, or potassium hydroxide, more preferably sodium or potassium hydroxide, and most preferably potassium hydroxide. The hydrolysis generally takes place within 3 hours at 75° C.

After the hydrolysis, any hydrolysis byproducts may be distilled off, and if an alkali metal or alkaline earth metal hydroxide was used as the base, then the demulsifier polymer will be present as the alkali metal or alkaline earth metal salt of the phenol.

General information concerning the polymerization and hydrolysis steps may be found in U.S. Pat. No. 4,678,843 (Elmore - Celanese, 1987) and Danusso et al, Chim. Ind. 47(5) p. 493–496 (1965) [Chemical Abstracts 63:5765e], both of which are incorporated herein by reference.

The finished demulsifier polymer is useful to resolve oil-in-water emulsions. By "oil-in-water emulsions" is meant emulsions in which a discontinuous oil phase is present in a continuous aqueous phase. By "oil phase" is meant any generally hydrophobic compound such as non-polar hydrocarbon compounds. By "aqueous phase" is meant water, brine, or water miscible liquids such as alcohols or glycols. Generally, the volume of oil phase will be less than the volume of aqueous phase.

Oilfield emulsions containing small proportions of crude petroleum oil relatively stably dispersed in water or brine are representative oil-in-water emulsions. Other oil-in-water emulsions include steam cylinder emulsions, in which traces of lubricating oil are found dispersed in condensed steam from steam engines and steam pumps, wax-hexane-water emulsions encountered in de-waxing operations in oil refining, butadiene tar-in-water emulsions formed in the manufacture of butadiene from heavy naphtha by cracking in gas generators and occurring particularly in the wash box waters of such systems, emulsions of "flux oil" in steam condensate produced in the catalytic dehydrogenation of butylene to produce butadiene, styrene-in-water emulsions in synthetic rubber plants, synthetic latex-in-water emulsions formed in plants producing butadiene-styrene copolymer or GR-S synthetic rubber, oil-in-water emulsions occurring in the cooling water systems of gasoline absorption plants, pipe press emulsions from steam-actuated presses in clay pipe manufacture, emulsions of petroleum residues-in-diethylene glycol formed in the dehydration of natural gas.

Oil-in-water emulsions contain widely differing proportions of dispersed phase. Where the emulsion is a waste product resulting from a flushing with water of manufacturing areas or equipment, the oil content may be only a few parts per million. Naturally occurring oil field emulsions of the oil-in-water class carry crude oil in proportions varying from a few parts per million to about 20%, or even higher in rare cases. The present invention has utility for all such oil-in-water emulsions, but has particular utility for emulsions having less than 10% oil, more particularly less than 5% oil.

The method of the present invention involves contacting an oil-in-water emulsion with an effective amount of the above-described demulsifier polymer. By "effective amount" is meant an amount sufficient to cause a measurable amount of the emulsion to resolve. Generally, the demulsifier polymer of the invention will be used at 0.05 to 1,000 ppm (parts per million), desirably 0.1 to 500 ppm, preferably 0.5 to 100 ppm, and more preferably 1 to 12 ppm, based on the weight of the emulsion.

The polymer of the invention may be used in a variety of forms, but is preferably used as an aqueous solution. If the polymerization took place in water, a separate step of forming a solution can be avoided.

Although the contacting may be effected by simply pouring the demulsifier polymer into the emulsion, it is greatly preferred that the contacting include thorough mixing, such as by shaking, pumping, or stirring.

As the emulsion is resolved, the oil phase will coalesce and rise to the top of the water, allowing the two separate phases to be separated in a conventional manner.

The invention will be further illustrated in the following examples. In the examples, all parts and percentages are by weight unless otherwise stated.

EXAMPLE 1

15 g of powdered polyvinyl phenol (Mw=5,000; 6 ppm of iron; prepared from acetoxy styrene by Hoechst-Celanese) were added slowly to a rapidly stirred solution of 5 g of NaOH in 80 g of water. The resulting 15% active (weight) solution was a dark amber color and was free of solids. The solution was then further diluted with water to yield a 1% active solution.

The composition was evaluated by adding 10, 20, 40, 80, or 120 μl portions of the 1% active solution to 6-ounce bottles containing 100 ml samples of oily water from an oil well produced fluids stream, to give treated samples at 1, 2, 4, 8, or 12 ppm active. The bottles were shaken by hand for 200 shakes and allowed to set for 15 minutes. The effectiveness of the demulsifier was then evaluated on a five-point scale as follows:

0 = no treatment
1 = some improvement
2 = mostly resolved
3 = free oil + slightly hazy water
4 = free oil + clear water, with "+" and "−" are used to denote slightly better and slightly worse within a category.

The procedure was repeated for similar polymers of higher molecular weight (Mw=20,000 and 90,000). The data are in Table I.

COMPARATIVE EXAMPLE 1

The testing procedure of Example 1 was repeated for a commercial oilfield demulsifier which is a polyanionic copolymer of acrylic acid and an acrylic ester. The data for these tests are also in Table I.

TABLE I

| Sample | Type | Concentration (ppm) | Performance |
|---|---|---|---|
| 1-0* | none | 0 | 0 |
| 1-1 | polyvinyl phenol (Mw = 5,000) | 2 | 3− |
| 1-2 | " | 4 | 3 |
| 1-3 | " | 8 | 3+ |
| 1-4 | " | 12 | 3+ |
| 1-5 | " | 2 | 2+ |
| 1-6 | " | 4 | 3+ |
| 1-7 | " | 8 | 3+ |
| 1-8 | " | 12 | 3+ |
| 1-9 | polyvinyl phenol (Mw = 90,000) | 2 | 2+ |
| 1-10 | " | 4 | 3 |
| 1-11 | " | 8 | 3+ |
| 1-12 | " | 12 | 3+ |
| 1-13* | poly (acrylic acid + acrylic ester) | 1 | 1 |
| 1-14* | " | 2 | 1+ |
| 1-15* | " | 4 | 1− |

*Not an example of the invention.

EXAMPLE 2 AND COMPARATIVE EXAMPLE 2

In a manner similar to Example 1 and Comparative Example 2, a polyvinyl phenol (Mw=5,000) (2-1 to 2-4); and several commercial demulsifiers, a poly(acrylic acid + acrylic acid ester) (2-5 to 2-8), a cationic polyacrylamide (2-9 to 2-12), a polyalkanolamine condensation product (2-13 to 2-16), and a polyamine condensation product (2-17 to 2-20) were evaluated. The data appear in Table II.

TABLE II

| Sample | Type | Concentration (ppm) | Performance |
|---|---|---|---|
| 2-1 | polyvinyl phenol (Mw = 5,000) | 2 | 2+ |
| 2-2 | " | 4 | 2+ |
| 2-3 | " | 8 | 3- |
| 2-4 | " | 12 | 2+ |
| 2-5* | poly(acrylic acid + acrylic ester) | 1 | 1- |
| 2-6* | " | 2 | 1+ |
| 2-7* | " | 4 | 1 |
| 2-8* | " | 8 | 0+ |
| 2-9* | polyacrylamide | 1 | 0 |
| 2-10* | " | 2 | 0 |
| 2-11* | " | 4 | 1- |
| 2-12* | " | 8 | 1 |
| 2-13* | polyalkanolamine condensate | 1 | 0 |
| 2-14* | " | 2 | 0 |
| 2-15* | " | 4 | 0 |
| 2-16* | " | 8 | 0 |
| 2-17* | polyamine condensate | 1 | 0+ |
| 2-18* | " | 2 | 0 |
| 2-19* | " | 4 | 0 |
| 2-10* | " | 8 | 0 |

*Not an example of the invention.

What is claimed is:

1. A method of resolving an oil-in-water emulsion comprising contacting the emulsion with a demulsifying effective amount of a demulsifier polymer having repeating units of the structure

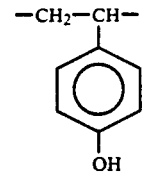

or salts thereof, said polymer having a molecular weight of from about 5,000 to about 90,000 and being derived from a composition comprising about 30 to 100 mole percent acetoxystyrene and from 0 to about 70 mole percent of a comonomer selected from the group consisting of styrene, methylstyrene, ethylstyrene, isobutylstyrene, 1,3-butadiene, isoprene, acrylic acid, methacrylic acid, and a lower alkyl ester of acrylic or methacrylic acid.

2. The method of claim 1 wherein the polymer is in the form of a salt.

3. The method of claim 2 wherein the salt is the salt of an alkali metal or an alkaline earth metal.

4. The method of claim 3 wherein the salt is the salt of an alkali metal.

5. The method of claim 4 wherein the salt is the potassium salt.

6. The method of claim 1 wherein the comonomer is styrene or methylstyrene.

7. The method of claim 1 wherein the emulsion contains less than 10% oil.

8. The method of claim 1 wherein the polymer is added at 0.5 to 100 ppm, based on the weight of the emulsion.

9. The method of claim 1 wherein the emulsion is contacted with the polymer by shaking, pumping, or stirring.

10. The method of claim 1 wherein after contacting the emulsion with the polymer, the water and oil are separated.

* * * * *